United States Patent [19]

Naab et al.

[11] 4,164,953
[45] Aug. 21, 1979

[54] NORMALLY-CLOSED ELECTRO-THERMALLY OPERATED FLOOD VALVE

[75] Inventors: Carlton W. Naab, Williamsville; Roman Jankowiak, Cheektowaga, both of N.Y.

[73] Assignee: Conax Corporation, Buffalo, N.Y.

[21] Appl. No.: 849,973

[22] Filed: Nov. 9, 1977

Related U.S. Application Data

[63] Continuation-in-part of Ser. No. 750,241, Dec. 13, 1976, abandoned.

[51] Int. Cl.² .................. F16K 13/04; F16K 13/06; F16K 17/40; F16K 51/00
[52] U.S. Cl. ............................................. 137/72; 89/1 B
[58] Field of Search .................. 137/62, 70, 72, 76; 89/1 B

[56] References Cited

U.S. PATENT DOCUMENTS

| | | | |
|---|---|---|---|
| 2,620,815 | 12/1952 | Margraf et al. | 137/72 |
| 3,008,479 | 11/1961 | Mancusi, Jr. | 137/72 |
| 3,428,064 | 2/1969 | Phillips et al. | 137/72 |
| 3,822,895 | 7/1974 | Ochiai | 137/72 |
| 3,888,158 | 6/1975 | Temple | 89/1 B |
| 4,046,157 | 9/1977 | Cazalaa et al. | 137/76 |

Primary Examiner—Charles T. Jordan
Assistant Examiner—Thomas H. Webb
Attorney, Agent, or Firm—Sommer & Sommer

[57] ABSTRACT

A flood valve is adapted to be mounted in an opening provided through a wall to normally separate a fluid on one side thereof from a relatively unpressurized space on the other side thereof. The valve includes an integrally-formed plastic body member having a forward portion mounted in the opening, an intermediate thin-walled section, and a rearward portion arranged in the unpressurized space. A piston is slidably mounted in a bore provided in the forward portion to engage the rearward portion, and forms a sealed chamber within the bore adjacent the thin-walled section. A heating element encircles the thin-walled section and may be selectively energized to melt the same, and to allow the rearward portion and the piston to separate from the forward portion. After such separation, fluid may pass through the forward portion bore to enter the unpressurized space.

7 Claims, 3 Drawing Figures

NORMALLY-CLOSED ELECTRO-THERMALLY OPERATED FLOOD VALVE

CROSS-REFERENCE TO RELATED APPLICATION

This application is a continuation-in-part of pending application Ser. No. 750,241, filed Dec. 13, 1976, abandoned Jan. 14, 1977. This application claims the subject matter originally claimed in parent application Ser. No. 750,241. The disclosure of this application is a partial disclosure of parent application Ser. No. 750,241. This application does not contain new matter not disclosed in said parent application Ser. No. 750,241. This application claims the benefit of the earlier filing date of said parent application Ser. No. 750,241 under 35 U.S.C. § 120.

BACKGROUND OF THE INVENTION

1. Field of the Invention

The present invention relates generally to a valve, and more particularly to an improved flood valve which may be selectively operated to permit fluid under pressure to enter a relatively unpressurized space.

2. Description of the Prior Art

Many types of flood valves have heretofore been developed, and such valves are used in a number of varying applications.

Specific details of other types of flood valves may be found in one or more of the following U.S. Pat. Nos.: 2,950,022; 1,488,630; 1,808,684; 1,821,779; 2,326,050; and 2,620,815.

SUMMARY OF THE INVENTION

The present invention provides a normally-closed electro-thermally operated flood valve which is adapted to be mounted in an opening provided through a wall separating a pressurized fluid on one side thereof from a relatively unpressurized space on the other side thereof.

The inventive flood valve comprises a body member adapted to normally close the opening to sealingly separate the pressurized fluid from the unpressurized space, this body member having a forward portion adapted to be sealingly mounted in the opening and provided with a cylindrical bore, having a rearward portion arranged in the unpressurized space, and having a thin-walled section joining the forward and rearward portions; a piston assembly slidably mounted in the bore and arranged to engage the rearward portion, this piston assembly having one face exposed to the fluid and being arranged to define a sealed chamber between its other face and one side of the rearward portion, this sealed chamber being arranged proximate the thin-walled section; and an electrical heating element surrounding the thin-walled section and adapted to be selectively energized to melt the thin-walled section to permit the rearward portion to separate from the forward portion.

Therefore, the inventive flood valve is adapted to normally close the opening, and may be selectively operated to melt the thin-walled section to permit the pressure of the fluid to displace the piston assembly and rearward portion away from the forward portion and to permit fluid to enter the unpressurized space through the bore of the forward portion.

If desired, the inventive flood valve may further include a resilient member, such as a spring, arranged to act between the forward and rearward portions and operative to urge the rearward portion to move into the unpressurized space. The thin-walled section may be provided with at least one annular recess extending into the thin-walled section from the unpressurized space, and the heating element may be arranged in this recess to substantially encircle the thin-walled section. The body member may be provided with one or more ports communicating the unpressurized space with the sealed chamber to provide a means by which the integrity of the sealed chamber may be monitored. The piston assembly may be suitably secured to the rearward portion. Preferably, the piston assembly and the body member are integrally formed of a suitable plastic material, such as a rigid polyvinyl chloride.

Accordingly, one general object of the present invention is to provide an improved flood valve of the normally-closed electro-thermally operated type.

Another general object is to provide an improved flood valve having a minimum number of moving parts and which is highly reliable in operation.

These and other objects and advantages will become apparent from the foregoing and ongoing specification, the drawings and the appended claims.

DESCRIPTION OF THE PREFERRED EMBODIMENTS

Figure 1:
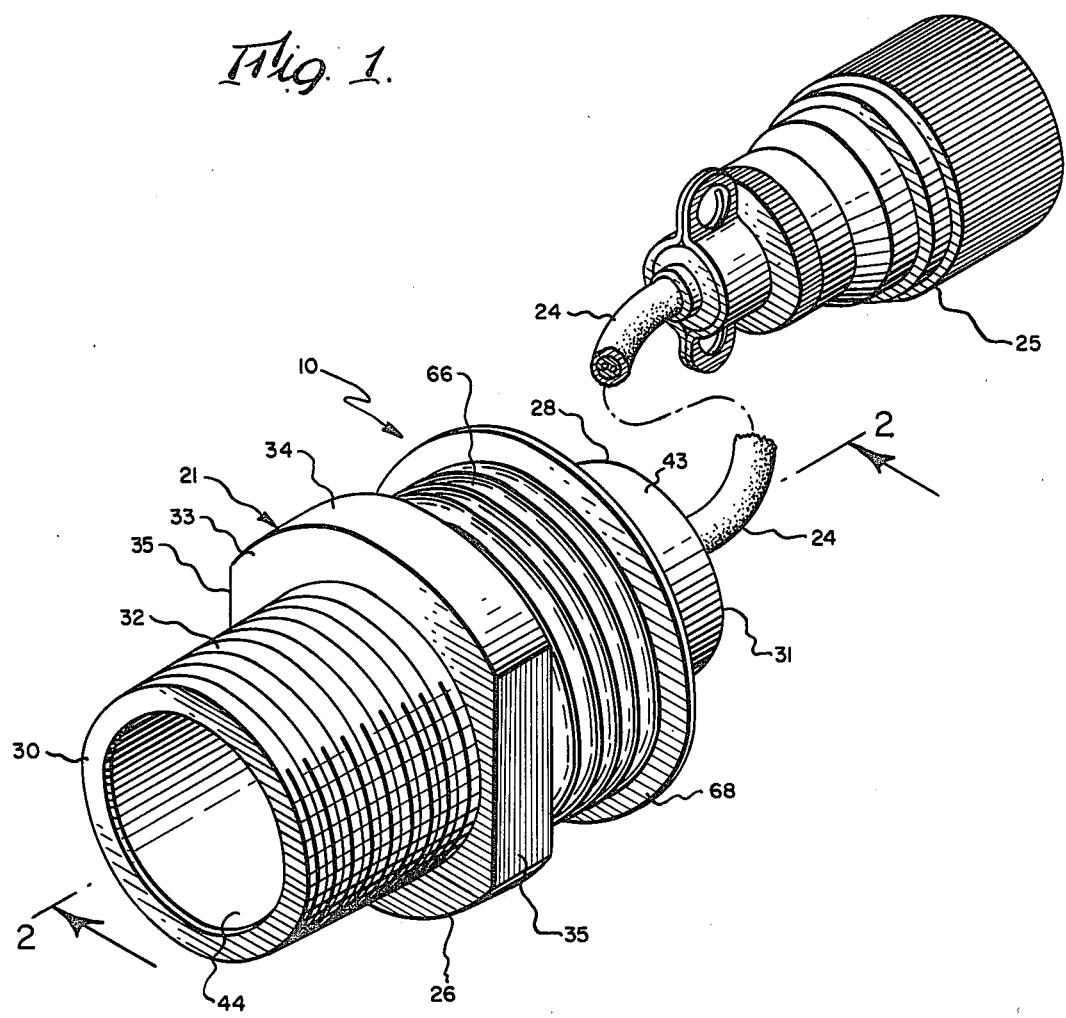
FIG. 1 is a perspective exterior view of the inventive flood valve, this view principally showing the forward and rearward portions of the body member, and the spring arranged to act therebetween.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, the invention provides an improved flood valve, of which a presently preferred embodiment is generally indicated at 10, which may be used in association with a wall, generally indicated at 11, provided with an opening therethrough and separating a pressurized fluid on one side thereof from an unpressurized space on the other side thereof. The improved flood valve 10 possesses a general utility and could, for example, be employed to selectively flood a compartment of an offshore oil drilling rig, or to selectively release fluid stored in a tank. These additional applications are illustrative only, and are not intended to be limitative of the scope of the appended claims. Hence, the inventive flood valve 10 possesses a general utility to normally close an opening provided through a wall, which wall is arranged to separate a fluid on one side thereof from a relatively unpressurized space on the other side thereof. The improved flood valve may be selectively operated to allow fluid to pass through the wall opening to enter the unpressurized space.

Figure 2:
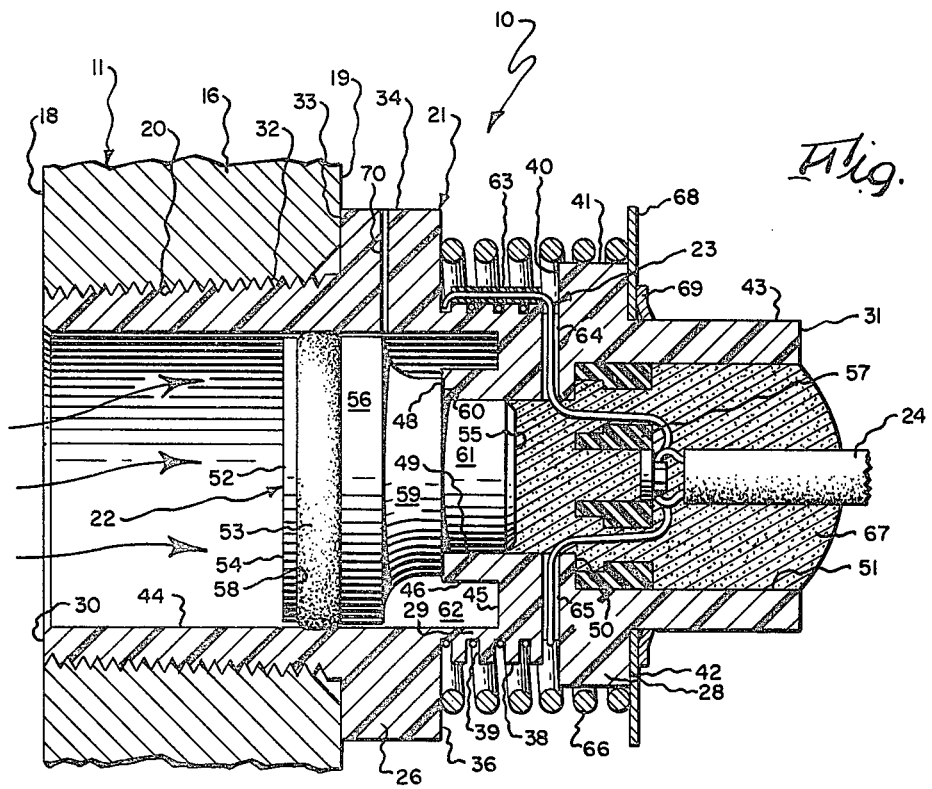
FIG. 2 is a further enlarged fragmentary vertical sectional view thereof, taken generally on line 2—2 of FIG. 1, and principally showing the forward portion, the rearward portion, the thin-walled section, the piston assembly, and the heating element.

As best shown in FIG. 2, wall 16 arranged to separate pressurized fluid, such as sea water, on the left or outer side 18 thereof, from an unpressurized space, on the right or inner side 19 thereof. This wall 16 is shown as being further provided with an internally-threaded opening 20 communicating its two sides 18, 19. As used herein, the term "pressurized fluid" is intended to mean any fluid, liquid or gas, which is pressurized relative to the unpressurized space such that such fluid will tend to flow into the unpressurized space. Hence, the pressure of such fluid is greater than the pressure in such space, regardless of the actual pressure in such space.

Referring now collectively to FIGS. 1 and 2, the inventive flood valve 10 is shown as broadly including a body member, generally indicated at 21, a piston assembly, generally indicated at 22, an electrical heating element, generally indicated at 23, and an electrical conductor 24 operatively joining the heating element 23 with a conventional electrical connector assembly 25 (FIG. 1). This electrical connector assembly is well known in this art, and forms no part of the present invention, except as providing a means for connecting the heating element with a source of electrical energy (not shown).

In the presently preferred embodiment, the body member 21 is integrally formed of a suitable plastic, preferably a rigid polyvinyl chloride. This body member 21 has a forward portion 26 adapted to be sealingly mounted in wall opening 20, a rearward portion 28 arranged in the unpressurized space, and an intermediate thin-walled section 29 joining the forward and rearward portions.

More specifically, the body member 21 is a uniquely configured structural member having an annular vertical left end face 30; an annular vertical right end face 31; an outer surface including, from left to right in FIG. 2, an externally-threaded portion 32 extending rightwardly from left end face 30, a leftwardly-facing annular vertical surface 33, a substantially cylindrical surface 34 provided with a pair of diametrically-opposite parallel flats 35 (FIG. 1) which are adapted to be grasped by a suitable tool (not shown) to rotate the body member, a rightwardly-facing annular vertical surface 36, a horizontal cylindrical surface 38 provided with a plurality of annular recesses 39, a leftwardly-facing annular vertical surface 40, a horizontal cylindrical surface 41, a rightwardly-facing annular vertical surface 42, and a horizontal cylindrical surface 43 continuing rightwardly to join right end face 31; and a horizontal through-bore bounded by, from left to right in FIG. 2, a horizontal cylindrical surface 44 extending rightwardly from left end face 30, a leftwardly-facing annular vertical surface 45, a horizontal cylindrical surface 46 extending leftwardly from surface 45, a leftwardly-facing annular vertical surface 48, a horizontal cylindrical surface 49 extending rightwardly from surface 48, a rightwardly-facing annular vertical surface 50, and a horizontal cylindrical surface 51 continuing rightwardly to join right end face 31.

The piston assembly 22 is shown as including a piston member 52 slidably and sealingly mounted in forward portion cylindrical bore 44 by means of an O-ring 53. This piston member 52 has a circular vertical left face 54 exposed to the fluid; a circular vertical right face 55; and an outer surface including, from left to right in FIG. 2, a horizontal cylindrical surface 56 provided with an annular groove 58 in which O-ring 53 is received, an annular concave neck portion 59, a rightwardly-facing annular vertical surface 60, and a horizontal cylindrical surface 61 continuing rightwardly to join right end face 55. This piston member 52 may be conveniently formed of a suitable plastic material, such as a rigid polyvinyl chloride. After O-ring 53 has been received in groove 58, the piston assembly 22 may be slidably inserted into the forward portion bore 44 such that the rightward plug-like portion of the piston 52 will be received within rearward portion cylindrical surface 49. Preferably, the piston member 52 is adhesively bonded or otherwise secured to the body member rearward portion to prevent unintended separation therefrom.

Therefore, the piston assembly 22 is arranged to define a sealed annular chamber 62 bounded by piston member surface 59 and body member surfaces 44, 45 and 46. Moreover, it should be noted that this sealed chamber 62 is arranged on the inside of thin-walled section 29, for a purpose hereinafter explained.

As best shown in FIG. 2, the heating element 23 is a resistance wire operatively arranged in the annular recesses 39 of the thin-walled section. As previously noted, these recesses are preferably annular and not helical, and each convolution of the resistance wire heating element is arranged in each recess to substantially encircle the thin-walled section. To this end, a small groove communicates these recesses 39 to allow the single length of resistance wire to be wrapped around the thin-walled section in each of the grooves. It should be noted that the upper portion of the resistance wire crosses over the convolutions through an insulated sleeve 63 so as not to short circuit any of the convolutions. In the preferred embodiment, a terminal post assembly 57 is inserted into the rearward portion cylindrical bore 51, and is used to connect the insulated wires of conductor 24 with the distal ends of the resistance wire passing through radial holes 64, 65. Thereafter, the rearward portion cavity, bounded by piston member right face 55, and body member surfaces 49, 50 and 51, may be filled with potting compound 67 or the like.

Figure 3:
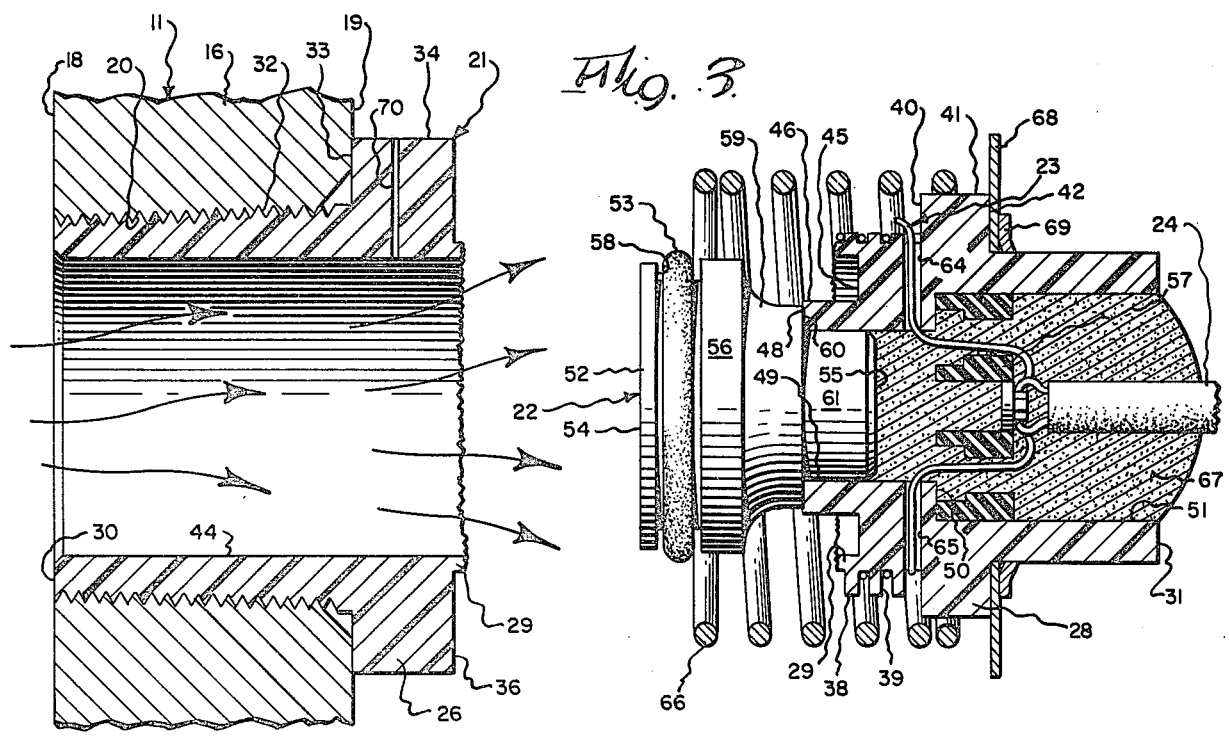
FIG. 3 is a view similar to FIG. 2, but showing the rearward portion as having been displaced away from the forward portion after the heating element has been energized to melt the thin-walled section.

If desired, a resilient member, such as coil spring 66, may be arranged to act on body member surface 36, and on an annular vertical flat washer 68 abutting surface 42 and retained in this position by a retaining ring 69. Persons skilled in this art will appreciate that spring 66 is compressed in the position shown in FIG. 3 so as to bias the rearward portion 28 to move rightwardly away from the forward portion 26 when thin-walled section 29 is melted. Also, the body member may be provided with one or more suitable holes such as hole 70, communicating the unpressurized space with the sealed chamber 62. This hole 70 provides a means by which the sealing integrity of O-ring 53 may be monitored.

Operation

Initially, it should be noted that the flood valve 10 may be threaded into the opening 20 from the unpressurized side. If desired, suitable O-Rings (not shown), or the like, may be employed to seal the threaded connection between the wall and the body member.

In the condition shown in FIG. 2, the valve 10 is normally closed, and functions to prevent pressurized fluid from entering the unpressurized space.

To operate the valve, the heating element 23 is suitably energized to heat and melt the thin-walled section 29. In this regard, the presence of sealed chamber 62 on the inside of the thin-walled section serves to maintain such heat in the vicinity of the thin-walled section, and to insure that the thin-walled section will melt predictably.

After the thin-walled section has melted, the pressure of the fluid, acting on piston left face 54, forces the rearward portion to separate and move away from the forward portion. If optional spring 66 is employed, the additional force exerted by this spring tends to supplement the separation force exerted by the fluid.

After the spring 66 and the rearward portion 28 have been separated from the forward portion (FIG. 3), fluid may readily enter the unpressurized space through forward portion bore 44.

In the preferred embodiment, the entire body member, including the forward and rearward portions and the thin-walled section, is integrally formed of a suitable plastic material. While such material is preferably a rigid polyvinyl chloride, the present invention contemplates that other materials may be used. Also, the body member need not necessarily be formed integrally, but may alternatively be formed of various components subsequently assembled together. Similarly, the provision of spring 66 is optional, as is the provision of monitoring hole 70. While many known types of resistance wires may be used, one embodiment thereof contains approximately 80% nickel and 20% chromium. The piston member is preferably formed of a rigid polyvinyl chloride.

Accordingly, the inventive flood valve may normally close the wall opening, and may be selectively operated to melt the thin-walled section to permit the pressure of fluid to displace the piston assembly and rearward portion away from the forward portion and to permit fluid to enter the unpressurized space through the bore of the forward portion.

Therefore, while the preferred embodiment of the present invention has been shown and described, persons skilled in this art will readily appreciate that various changes and modifications may be made without departing from the spirit of the invention, which is defined by the following claims.

What is claimed is:

1. A flood valve adapted to be mounted in an opening provided through a wall, said wall separating a pressurized fluid on one side thereof from an unpressurized space on the other side thereof, said flood valve comprising:
   a body member adapted to normally close said opening to sealingly separate said pressurized fluid from said unpressurized space, said body member having a forward portion adapted to be sealingly mounted in said opening and having a rearward portion arranged in said unpressurized space, said forward and rearward portions being joined by an intermediate thin-walled section, said forward portion having a cylindrical bore adapted to communicate one side of said rearward portion with said fluid;
   a piston assembly slidably mounted in said bore and arranged to engage said rearward portion, said piston assembly having one face exposed to said fluid and arranged to define a sealed chamber between its other face and said one side of said rearward portion, said sealed chamber being arranged proximate said thin-walled section; and
   an electrical heating element surrounding said thin-walled section and adapted to be selectively energized to melt said thin-walled section to permit said rearward portion to separate from said forward portion;
   whereby said flood valve may normally close said opening, and may be selectively operated to melt said thin-walled section to permit the pressure of said fluid to displace said piston assembly and rearward portion away from said forward portion and to permit fluid to enter said unpressurized space through the bore of said forward portion.

2. The flood valve as set forth in claim 1, and further comprising:
   a resilient member arranged to act between said forward portion and said rearward portion and operative to urge said rearward portion to move away from said forward portion.

3. The flood valve as set forth in claim 1 wherein said thin-walled section is provided with at least one annular recess extending into said thin-walled section from said unpressurized space, and wherein said heating element is arranged in said recess to substantially encircle said thin-walled section.

4. The flood valve as set forth in claim 1 wherein said body member is provided with a port communicating said sealed chamber with said unpressurized space for availability in monitoring the integrity of said sealed chamber.

5. The flood valve as set forth in claim 1 wherein said piston assembly is secured to said rearward portion.

6. The flood valve as set forth in claim 1 wherein thin-walled section is formed of a polyvinyl chloride plastic material.

7. The flood valve as set forth in claim 1 wherein said body member is integrally formed of a polyvinyl chloride plastic material.

* * * * *